(No Model.) 4 Sheets—Sheet 1.
D. H. MERRITT.
EXTERNAL FRICTION BRAKE BAND FOR HOISTING MACHINERY, &c.
No. 282,349. Patented July 31, 1883.
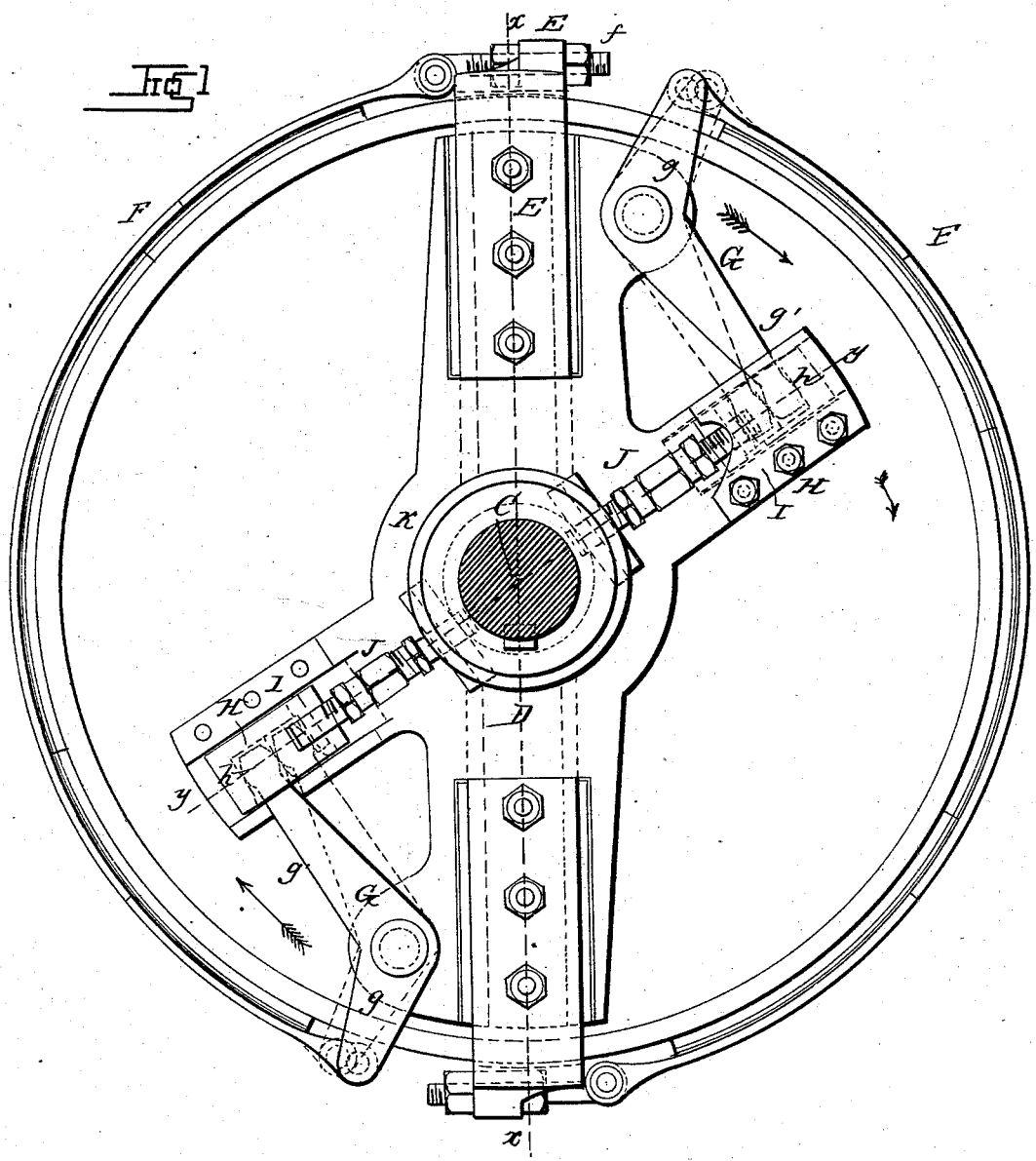
WITNESSES:
Fred G. Dieterich
J. G. Hinkel
INVENTOR.
Daniel H. Merritt
by DeWitt C. Allen
ATTORNEY

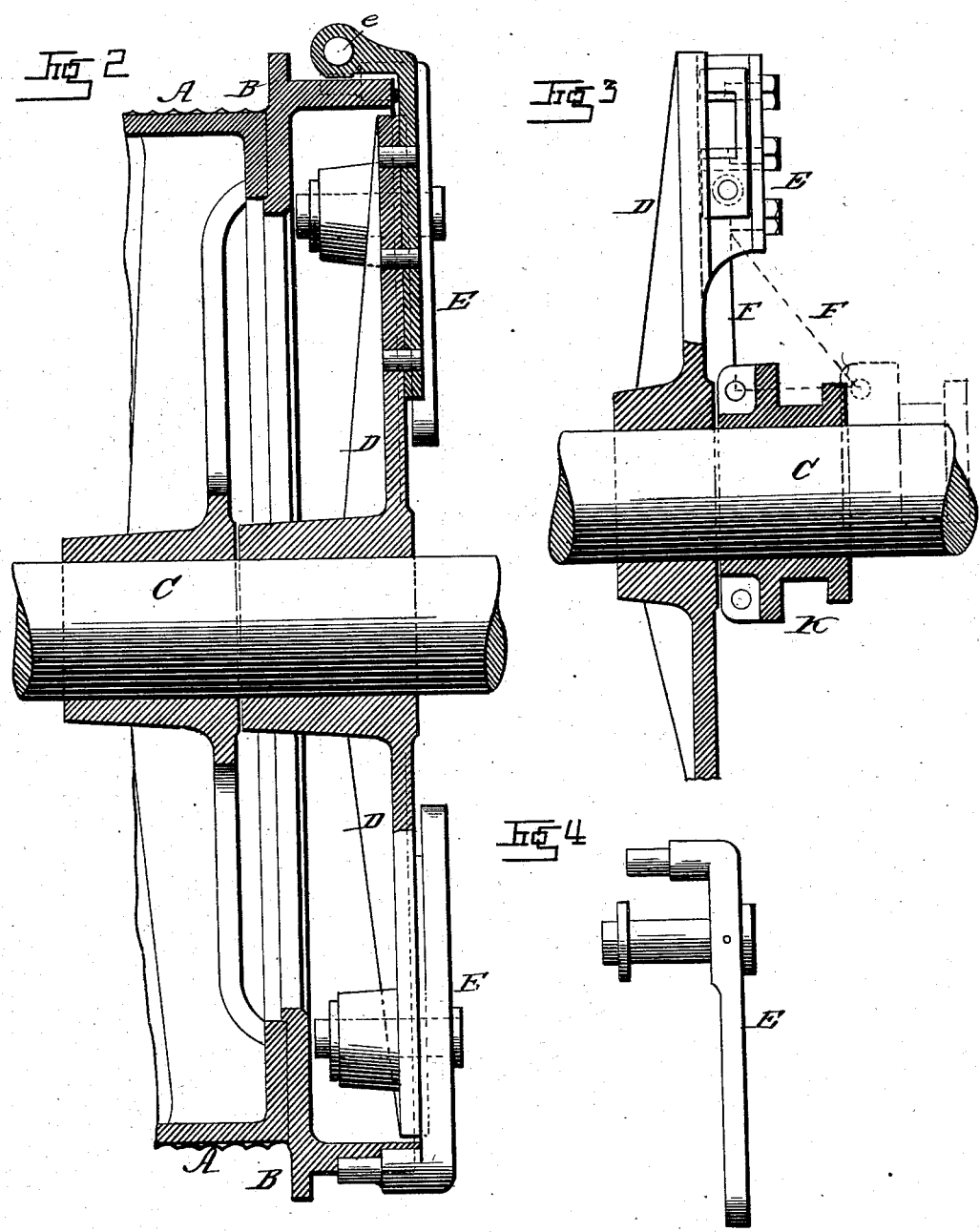

(No Model.) 4 Sheets—Sheet 3.
D. H. MERRITT.
EXTERNAL FRICTION BRAKE BAND FOR HOISTING MACHINERY, &c.
No. 282,349. Patented July 31, 1883.
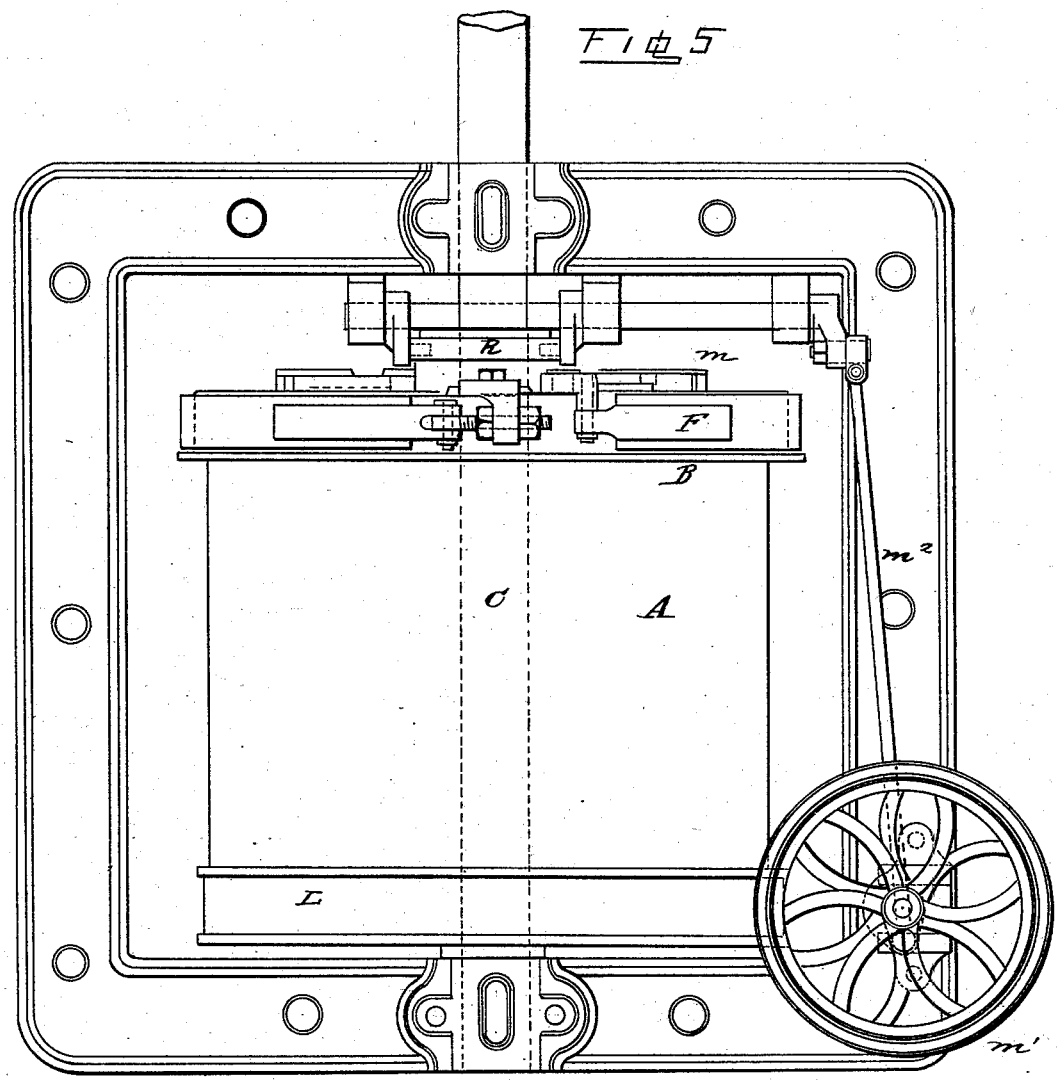
WITNESSES:
INVENTOR.
Daniel H. Merritt
by DeWitt C. Allen
ATTORNEY (No Model.) 4 Sheets—Sheet 4.
D. H. MERRITT.
EXTERNAL FRICTION BRAKE BAND FOR HOISTING MACHINERY, &c.
No. 282,349. Patented July 31, 1883.
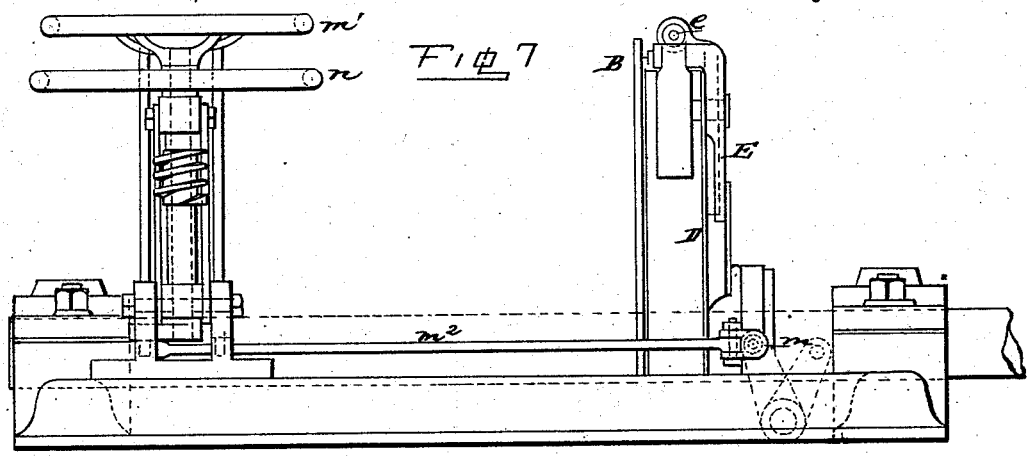
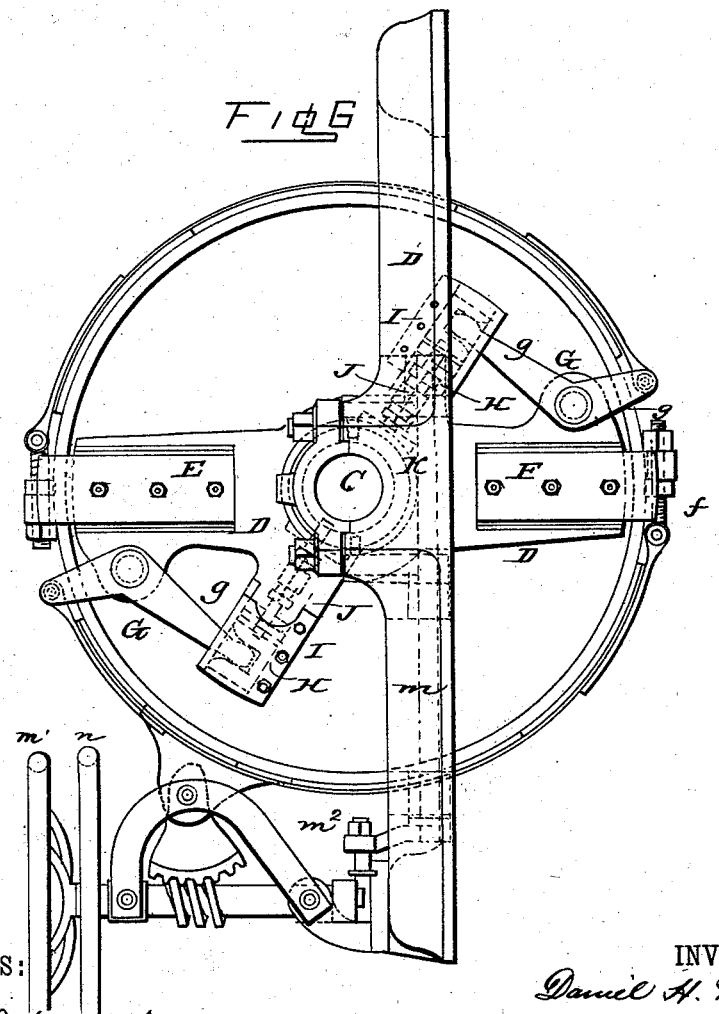
WITNESSES:
Fred. G. Dieterich
J. G. Hinkel
INVENTOR.
Daniel H. Merritt
by DeWitt C. Allen
ATTORNEY

United States Patent Office.

DANIEL H. MERRITT, OF MARQUETTE, MICHIGAN.

EXTERNAL FRICTION BRAKE-BAND FOR HOISTING MACHINERY, &c.

SPECIFICATION forming part of Letters Patent No. 282,349, dated July 31, 1883.

Application filed June 9, 1883. (No model.)

*To all whom it may concern:*

Be it known that I, DANIEL H. MERRITT, a citizen of the United States, residing at Marquette, in the county of Marquette and State of Michigan, have invented certain new and useful Improvements in External Friction Brake-Bands for Hoisting and other Machinery; and I do hereby declare the following to be a full, clear, and exact description of the invention, such as will enable others skilled in the art to which it appertains to make and use the same.

This invention relates to certain new and useful improvements in external friction brake-bands for hoisting and other machinery, and more particularly to improvements upon my former patents, dated April 3, 1877, No. 189,123; February 8, 1881, No. 237,570, and April 11, 1882, No. 256,236.

The object of the present invention is the production of mechanism for operating an external and sectional friction brake-band while dispensing with spring-connections or the use of jointed levers and the inclined surfaces with connecting-arms, for the purpose of releasing the band frictional contact from the drum when thrown out, and also to secure a perfect counterbalance to the machine, while obviating any tendency to pull the drum toward the brake-band when applied, which increases the friction on the journal-bearings, as is generally the case in the class of external brake-bands; and to this end the invention consists in novel features of construction and combination and arrangement of parts, all as will be hereinafter fully described, and set forth in the claims hereto annexed.

Referring to the accompanying drawings, Figure 1 represents an end elevation of a hoisting-machine embodying my improvements; Fig. 2, a section through the line $x$ $x$ of Fig. 1; Fig. 3, a section through the line $y$ $y$ of Fig. 1; Fig. 4, detail view of one of the thrust-plates; Fig. 5, top view or plan of a hoisting-machine, showing means for operating the sliding collar. Figs. 6 and 7 are respectively end and side elevations of the same.

In the drawings, A represents a drum working loose on the shaft C; B, a brake-wheel cast with or securely fastened to the drum, and D a two-armed driver keyed to the shaft C, revolving under or inside of the brake-wheel B.

E E are thrust-plates formed from wrought-iron and bolted to arms of the driver D, and they are bent over the outside of the brake-wheel, and have upon their ends eyes $e$ $e$, to receive the adjusting-screws $f f$ of the divided brake-bands F F, which are hinged thereto.

G G are bell-cranks fulcrumed to the driver D, and the short arm $g$ of each bell-crank being hinged to one end of each brake-band, while the long arms $g'$, which are toothed shaped work in recesses $h$ $h$ of the sliding blocks H H, which are kept in place on the driver D by the guard-plates I I, and sliding freely when moved by the adjustable toggle-bars J J. The toggle-bars J J are connected to the collar K, which slides on the shaft C, and is operated by a lever or hand-wheel.

The operation is as follows: The driver D, with the attached brake-bands F F, revolve with the shaft C perfectly clear of the wheel A or drum B, which is loose on the shaft, with the collar and toggle-bars in the position shown in dotted lines, Fig. 3. When the collar is moved to the position shown in plain lines, Fig. 3, the toggle-bars J J push the sliding blocks H H outward, thus imparting motion to the bell-cranks G G, through which the brake-bands F F receive a corresponding motion, and are drawn toward and clasp the brake-wheel B, causing it to revolve in the same direction and with the same velocity as the shaft. The driver rotates in the direction indicated by the arrows, Fig. 1, and therefore any friction created between the brake-bands and brake-wheel assists in tightening the brake-bands, thus materially lessening the strain otherwise necessary to be exerted by the bell cranks or levers. The principal strain exerted by the bands during the operation of the machine is borne by the thrust-plates E E, the shape of which allow of their being made very strong with a moderate amount of metal, and as there are two of said thrust-plates and a divided brake-band, each one of which being strong enough to hold the load, there is a double margin for safety. The application of power being on the opposite sides of the brake-wheel or drum, and every part being perfectly balanced by its counterpart diagonally, the full power will be transmitted from the shaft through the intermediate mechanism in a smooth and steady manner, with very little exertion by attendant. To stop the drum, the collar K is drawn back toward the position indicated by the dotted lines, Fig. 3, far enough to release the brake-bands, or so far as will partially release them, when by the application of the auxiliary brake-band L (shown on the opposite end of drum, see Fig. 5) the drum is brought to rest. When it is desired to unwind the rope from the drum, the collar K is drawn still farther back, or until the movement of the bell-cranks entirely release the brake-bands from contact with brake-wheel, (without the aid of auxiliary fixtures used by other machines for that purpose,) when the weight of the empty bucket or cage will be sufficient to unwind the rope. The movement of the sliding collar K in or out to effect the expanding or contracting or clutching or unclutching action of the sectional divided brake-bands F F is effected by the rod $m$, connected to said collar, and operated by the hand-wheel $m'$ and an intermediate connecting crank-rod, $m^2$, as shown in Figs. 5, 6, and 7, while the auxiliary brake-band L has it opposite ends connected to the opposite arms of a toothed segment, which meshes with a worm securely mounted on a spindle, which is operated by a hand-wheel, $n$.

It will be observed that I use an armed driver with sliding blocks and a divided band, being fastened to each end of the driver and operated by the sliding blocks and bell-cranks, thereby dispensing with the jointed lever and the inclined surfaces with the connecting-arms, for the purpose of releasing the band frictional contact from the drum when thrown out, for as the collar is thrown away from the driver, or outward on the shaft, the sliding blocks are drawn inward, and the bell-cranks being attached to the same and partaking of the same motion, the inner ends of the cranks are thrown downward or inward, and the outer ends are moved in the direction of the brake-fastenings on the other end of the driver, and therefore causes the band to be released from contact with the surface of the drum without the use of springs, connections, or inclined surfaces. The use of the armed driver and the divided band secures a perfect counterbalance in the machine.

The brake-band for stopping the drum is hinged or pivoted at the lower end, and entirely obviates the objection found in hoisting-machines—viz., a tendency to pull the drum toward the brake when applied. This brake-band is drawn toward the drum when applied, and simply clasps it concentrically, and does not tend to draw it out of line and increase the friction in the journal-bearings.

I do not wish to be understood as claiming, broadly, anything shown, described, or claimed in my former patents before referred to.

Having thus fully described my invention, what I claim as new, and desire to secure by Letters Patent, is—

1. In an external clutch for hoisting and other machinery, the combination of the loose drum and brake-wheel connected thereto, the two-armed driver keyed to the revolving shaft, the sliding collar, the external brake-band, formed in two sections and each section connected at one end to the opposite ends of the driver, and the intermediate mechanism for connecting the other ends of said brake-band with the sliding collar, consisting of the bell-cranks pivoted to said sections of brake-band, the sliding blocks, and toggle-bars, substantially in the manner as and for the purpose herein shown and described.

2. In an external clutch for hoisting and other machinery, the combination, with the drum, of the external brake-band, formed in two sections and arranged at one end of said drum, the stopping-brake, arranged at the opposite end of the drum, and mechanism for operating said brake-bands and brake, substantially as herein shown and described.

3. In an external clutch for hoisting and other machinery, the combination of the loose drum and brake-wheel connected thereto, the sliding collar, the two-armed driver, keyed to the revolving shaft and provided with the thrust-plates, the external brake-band, formed in two and each section pivotally connected at one end to the ends of the thrust-plates, and the intermediate mechanism for connecting the other ends of said brake-band with the sliding collar, consisting of the bell-cranks pivoted to said sections of brake-band, the sliding blocks, and toggle-bars, substantially as and for the purpose herein shown and described.

4. In an external clutch for hoisting and other machinery, the combination of the loose drum and brake-wheel, the sliding collar, driver, and sectional brake-band, and intermediate mechanism for connecting said band with said collar and driver, and the mechanism for operating said collar, consisting of the rod $m$, hand-wheel $m'$, and intermediate cranked connecting-rod, $m^2$, substantially as and for the purpose herein shown and described.

In testimony whereof I affix my signature in presence of two witnesses.

DANIEL H. MERRITT.

Witnesses:
ED. A. MERRITT,
M. H. MAYNARD.